US008786672B2

(12) United States Patent
Olavi

(10) Patent No.: US 8,786,672 B2
(45) Date of Patent: Jul. 22, 2014

(54) MONITORING CAMERA AND METHOD FOR MONITORING

(71) Applicant: Axis AB, Lund (SE)

(72) Inventor: Jesper Olavi, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 13/723,043

(22) Filed: Dec. 20, 2012

(65) Prior Publication Data

US 2013/0162760 A1 Jun. 27, 2013

Related U.S. Application Data

(60) Provisional application No. 61/579,435, filed on Dec. 22, 2011.

(30) Foreign Application Priority Data

Dec. 21, 2011 (EP) ..................................... 11194890

(51) Int. Cl.
*H04N 7/00* (2011.01)
*H04N 5/225* (2006.01)
*G08B 13/196* (2006.01)
*G03B 5/00* (2006.01)
*H04N 5/232* (2006.01)
*G03B 17/12* (2006.01)

(52) U.S. Cl.
CPC ......... *H04N 5/23238* (2013.01); *H04N 5/2259* (2013.01); *G08B 13/19652* (2013.01); *G03B 5/00* (2013.01); *G08B 13/19689* (2013.01); *G03B 17/12* (2013.01)
USPC .......................................................... 348/36

(58) Field of Classification Search
USPC .................................... 348/36, 143, 152, 155
See application file for complete search history.

(56) References Cited

U.S. PATENT DOCUMENTS

2003/0071891 A1* 4/2003 Geng .............................. 348/39
2011/0090341 A1 4/2011 Ikewada et al.

FOREIGN PATENT DOCUMENTS

EP 2120452 A1 * 11/2009
JP 2003-154894 A 5/2003

* cited by examiner

*Primary Examiner* — Andy Rao
*Assistant Examiner* — Jared Walker
(74) *Attorney, Agent, or Firm* — Volpe and Koenig, P.C.

(57) ABSTRACT

A monitoring camera is arranged to monitor a wide angle image view. The camera comprises an event detector arranged to signal that an event has occurred when an alert line/tripwire positioned in the wide angle image view has been crossed. The alert line is defined as a line enclosing a point of the wide angle image view. A method for monitoring an area using the monitoring camera comprises capturing images representing a wide angle view through a wide angle lens, detecting if an object in the images is crossing an alert line defined in the wide angle view as a line enclosing a point in the wide angle view, and in response to a detection of an object crossing the alert line, redirecting the camera from capturing images through the wide angle lens to a position capturing an image view including the area in which the alert line was crossed.

11 Claims, 6 Drawing Sheets

MONITORING CAMERA AND METHOD FOR MONITORING

CROSS REFERENCE TO RELATED APPLICATIONS

This application claims the benefit of U.S. Provisional Application No. 61/579,435, filed Dec. 22, 2011 and EP 11194890.7, filed Dec. 21, 2011, which are incorporated by reference as if fully set forth.

TECHNICAL FIELD OF THE INVENTION

The present invention relates to a monitoring camera and a method for monitoring using a monitoring camera.

BACKGROUND

Monitoring systems of today often requires that large areas are monitored using few cameras. In order to monitor large areas wide angle cameras are often used and are then mounted in a ceiling or on a post directed down towards the ground in order to monitor a big area extending 360 degrees around the monitoring camera. However a wide angle camera monitoring a large area may have difficulties detecting details close to the perimeter of the camera view. Hence, an operator may be likely to miss events if they happen far out in the periphery and even if the event would be detected the camera will probably not provide a sufficiently detailed image in order to for instance provide identification of a person or an event. In order to solve these problems additional cameras may be installed making it less likely that an event of interest occurs in a portion of the area where the camera is not able to provide sufficient image quality for identification. However, then the operator will have additional cameras to observe, which will make it more likely for the operator to miss events of interest.

EP 2 120 452 A1 discloses a monitoring camera for identifying a tracking target and to track the tracking target. During tracking of the tracking target, a determination is made as to whether or not the target to be tracked has intruded the inside of an area from the outside. In a case where the target has intruded the inside of a preset area from the outside, an alarm command is produced when the target continually remains in the area.

US 2011/0090341 A1 discloses an intruding object detection system. The system comprises a camera and a camera control unit. Upon detection of an intruding object, the camera control unit conducts pan and tilt of the camera head to bring the detected intruding object to the center of the image.

SUMMARY

An improved monitoring system includes a monitoring camera arranged to monitor a wide angle image view comprises an event detector arranged to signal that an event has occurred when an alert line positioned in the wide angle image view is crossed by an object. The alert line is defined as a line enclosing a point of the wide angle image view. This may result in an efficient detection of objects or persons entering the camera view of the wide angle camera and hence facilitate discovery of events in the camera view.

The monitoring camera further comprises a camera head including an image sensor and lenses, a pan motor arranged to pan the camera head in relation to a camera base, a tilt motor arranged to tilt the camera head in relation to the camera base, and a wide angle lens fixedly arranged in relation to the camera base and having its optical axis aligned with the rotational axis of the camera head when panned. As a result, identification of detected event or objects may be facilitated as the detection may be performed in an overview mode, capturing images through the wide angle lens, by means of the function of the alert line and then the identification relating to a crossing of the alert line may be achieved by simply redirecting the camera head directly towards the position of the crossing. In addition, the wide angle detection and the detailed identification may be performed by means of one camera thereby requiring fewer cameras.

According to one embodiment, the monitoring camera further comprises a transparent dome shaped cover which the camera head is enabled to capture images through and onto which the wide angle lens is attached.

According to yet another embodiment, the monitoring camera further comprises a camera position controller configured to generate control signals for the pan motor and the tilt motor, respectively, in order to control the direction of the camera head, wherein the camera position controller is connected to the event detector and is configured to, in response to a signal from the event detector, redirect the camera head from a view through the wide angle lens to a view including an area in which the alert line has been crossed. One advantage of this embodiment is that the chances of identifying an event are increased even if the operator did not observe an indication of a crossing of the alert line.

According to one embodiment, the alert line forms a shape and the monitoring camera further comprises means for changing the size of the shape in response to a size change request received at the camera. This facilitates customization of the alert line to the environment of the individual camera.

According to another embodiment, the alert line is enclosing a center point of the wide angle image view.

In another embodiment, the event detector detects alert line crossings by analyzing images captured by the camera and evaluating the images in view of data defining the alert line.

In yet another embodiment, the alert line is arranged substantially at a distance L from the perimeter of the wide angle image view, wherein L is at most a quarter of the longest distance across the wide angle image view.

According to another aspect, a method for monitoring an area using a monitoring camera comprises capturing images representing a wide angle view through a wide angle lens, detecting if an object in the images is crossing an alert line defined in the wide angle view as a line enclosing a point in the wide angle view, and in response to a detection of an object crossing the alert line redirecting the camera from capturing images through the wide angle lens to a position capturing an image view including an area in which the alert line was crossed. The camera comprises a camera head including an image sensor and lenses, a pan motor arranged to pan the camera head in relation to a camera base, and a tilt motor arranged to tilt the camera head in relation to the camera base. The images representing a wide angle view are captured through a wide angle lens fixedly arranged in relation to the camera base and having its optical axis aligned with the rotational axis of the camera head when panning. By having an alert line enclosing a point, an efficient detection of objects or persons entering the camera view of the wide angle camera may be had which facilitates discovery of events in the camera view. Additionally, identification of detected event or objects may be facilitated as the detection may be performed in the overview mode by means of the function of the alert line and then the identification relating to a crossing of the alert line may be achieved by simply redirecting the camera head directly towards the position of the crossing. In addition, the wide angle detection and the detailed identification may be performed by means of one camera, thereby requiring fewer cameras.

According to one embodiment, the method further comprises zooming, in connection with the redirection of the camera, a lens of the camera to a predetermined zoom value for capturing images of the area including an area where the alert line was crossed. In this way, the chances of identification may be even further increased.

According to another embodiment, the alert line forms a circle and in yet another alert line forms a polygon.

A further scope of applicability of the embodiments will become apparent from the detailed description given below. However, it should be understood that the detailed description and specific examples are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an", "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of an embodiment, with reference to the accompanying drawings, in which.

Further, in the figures like reference characters designate like or corresponding parts throughout the several figures.

DETAILED DESCRIPTION OF EMBODIMENTS

A monitoring camera and facilitating setting up such a camera is described herein.

Figure 1:
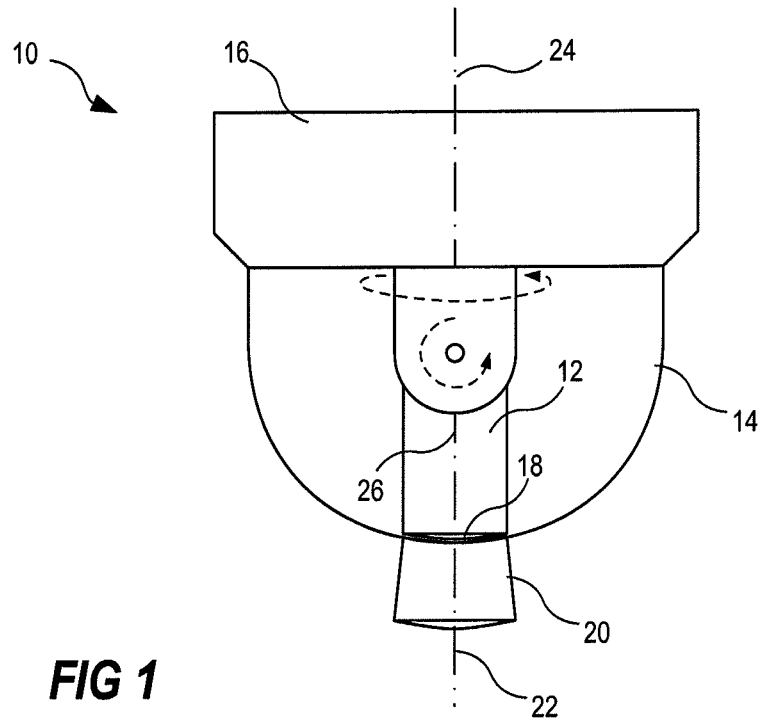
FIG. 1 is a schematic side view of a monitoring camera implementing one embodiment.

Referring to FIG. 1, according to one embodiment, the monitoring camera 10 is a dome camera including a camera head 12, a transparent dome cover 14, and a dome base 16. The camera head 12 is enabled to pan and tilt by means of electronically controlled motors, not shown. The camera head 12 may be any known camera head that is enabled to pan and tilt. Further, the camera head 12 includes a lens 18. The lens 18 is arranged to focus light representing a scene to be captured by the camera 10 onto an image sensor in the camera head 12. The viewing angle of the captured image may be fixed or variable. Variable viewing angle may be accomplished by having a zoom enabled lens 18. In case of a fixed viewing angle lens the selection of the viewing angle may differ between different applications of the camera.

The dome camera further comprises a wide angle lens 20 mounted on the transparent dome cover 14 and extending from the dome cover 14 and away from the camera head 12. The wide angle lens 20 is mounted in a direction making the optical axis 22 of the wide angle lens substantially coincide with a rotational axis 24 around which the camera head 12 is turned during panning, hereinafter referred to as panning axis 24. The viewing angle of the wide angle lens 20 is wider than the viewing angle of the lens 18 in the camera head 12. In one embodiment, the viewing angle of the wide angle lens 20 is substantially wider than the viewing angle of the lens 18 of the camera head 12. The resulting view angle of the wide angle lens may be more than 180 degrees. However, depending on the application the viewing angle may be less than 180 degree or more than 180 degree. The angle should at least be selected to provide a reasonable overview image.

Accordingly, the wide angle lens 20 is mounted so that the optical axis 26 of the camera head 12 is aligned with the optical axis 22 of the wide angle lens 20 when the camera head 12 is directed for capturing an image through the wide angle lens 20.

Figure 2:
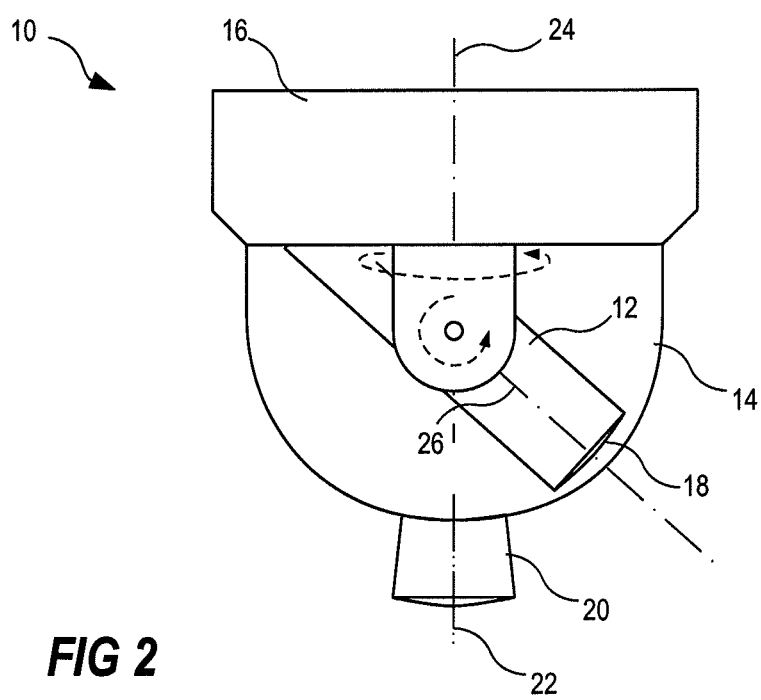
FIG. 2 is the same side view as in FIG. 1 with the difference that the camera head of the monitoring camera is tilted.

Due to the positioning of the wide angle lens 20, and the fact that the camera head 12 is moveable, it is possible to capture overview images through the wide angle lens 20 as depicted in FIG. 1. When something interesting is spotted or detected in the overview image, it is possible to investigate in more detail by simply moving the camera head 12 away from the wide angle lens 20, directing it towards the interesting event or feature, and capturing images through the dome cover. In FIG. 2, the camera is shown in a position for capturing the images through the dome cover in order to get a more detailed view and not through the wide angle lens 20.

In one embodiment, the viewing angle or the focal length of the lens 18 of the camera head 12 is selected so that when not captured through the wide angle lens 20, the images captured by the camera head 12 is adequate for providing relevant surveillance information. Examples of relevant surveillance information may, for instance, be the registration number of a car, an identifiable face of a person, detailed progress of an event, etc. For the situations in which the camera head is directed to capture images through the wide angle lens 20, the viewing angle of the wide angle lens 20 may be selected so that the camera head 12 will capture an image view of at least the floor of an entire room in which the monitoring camera is installed. Alternatively, the viewing angle of the wide angle lens 20 is selected so that the camera head 12 will capture an overview image of the monitored area when the camera head 12 is directed to capture images through the wide angle lens 20. Then an operator or an image analysis process may identify events or features of interest in the overview and redirect the camera head 12 for direct capture of a scene including the event or feature of interest. "Direct capture" in the above sentence should be understood as capturing an image by means of the camera head 12 when not directed to capture images through the wide angle lens 20.

Figure 3:
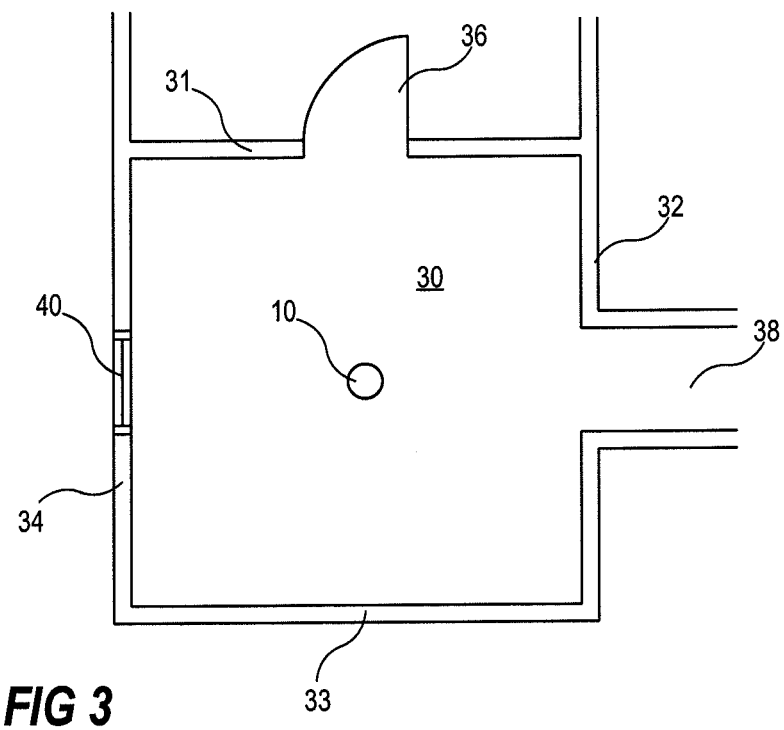
FIG. 3 is a schematic overview of an example room in which a monitoring camera according to one embodiment is installed.

In order to facilitate the understanding of the function of the camera, an example scenario will be described below. In the example scenario, a monitoring camera 10 according to one embodiment is installed in the ceiling of a room 30, see FIG. 3. The room includes four walls 31-34, wherein wall 31 hold a door 36 for passage to an area next to the room, wall 32 present a passage into a corridor 38, and wall 34 hold a window 40. It may be assumed in this example that the monitoring camera 10 is set in an overview mode, i.e. the camera head is capturing an overview image of the monitored area, by capturing images through the wide angle lens, the setting of the camera that is shown in FIG. 1. A frame from a video sequence from the monitoring camera 10 in overview mode may look like the image in FIG. 4 in which all four walls 31-34 of the monitored room 30 is captured by the overview camera view, i.e. the entire room 30 is captured by the monitoring camera when in overview mode. Moreover, the image frame reveals that a person 42 is entering the room. This may be even more evident from a video sequence including the image frame. If an operator having access to the imagery of this monitoring camera 10 and having authority to control the monitoring camera 10 find this person 42 interesting and would like to get a more detailed image of the person 42, then the operator may simply indicate the person 42 or the area of the person in the overview image at a control station and the camera head of the monitoring camera is directed away from the wide angle lens 20 and towards the indicated area of the monitored room 30. Hence, the camera head 12 will be moved into a position similar to the position showed in FIG. 2, and will possibly capture an image 44 as the one presented in FIG. 5. The image captured by the camera head 12 may have a wider or narrower image view depending on the lens 18 on the camera head 12 and/or the zoom setting of this lens 18. Then, when the operator has finished studying the person, the camera head 12 may be returned to capture images through the wide angle lens 20 and thereby be returned to the overview mode of the monitoring camera.

Figure 6:
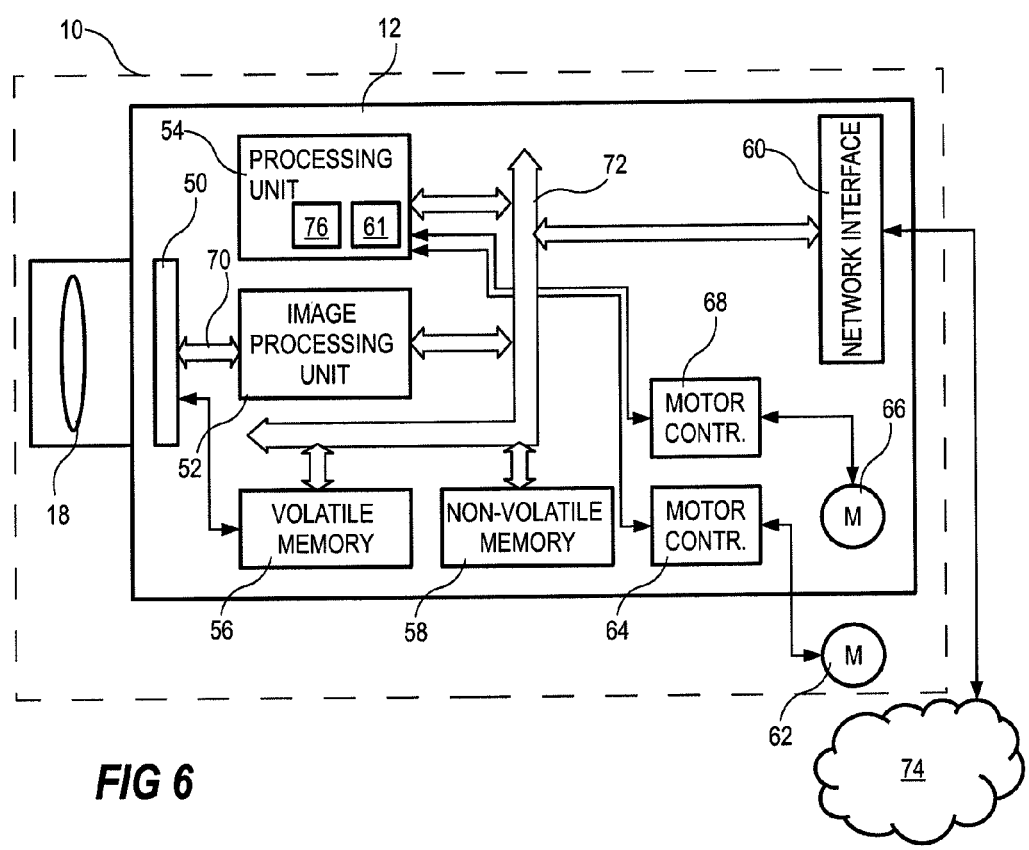
FIG. 6 is a schematic block diagram of a camera according to one embodiment.

According to one embodiment, see FIG. 6, the monitoring camera 10 includes an image sensor 50, an image processing unit 52, a general processing unit 54, a volatile memory 56, a non-volatile memory 58, a network interface 60, a camera position controller 61, a panning motor 62, a panning motor controller 64, a tilting motor 66, and a tilting motor controller 68. Further means and devices required in a camera in order to perform normal camera functionality and normal network activities are not described herein as these means and devices are well known to the person skilled in the art.

The image sensor 50 may be any known image sensor able to capture light representing an image view and convert the light to electrical signals which then may be processed into digital images and or digital image streams by the image processing unit 52. The image data from the image sensor is sent to the image processing unit 52 via connection 70. The image processing unit 52 and the general processing unit 54 may be the same device, may be implemented as separate units on the same chip, or may be separate devices. Moreover, many functions described below as being performed in the image processing unit 52 may be performed in the general process unit 54 and vice versa.

The processing units 52, 54 are connected to the volatile memory 56 for use as a work memory via for instance a bus 72. Moreover, the volatile memory 56 may be used as temporary data storage for image data during processing of the image data and the volatile memory 56 may therefore be connected to the image sensor 50 as well. The non-volatile memory 58 may store program code required for the processing units 52, 54 to operate and may store settings and parameters that is to be preserved for a longer time period and even withstand power outages. The processing units 52, 54 are connected to the non-volatile memory 58 via, for instance, the bus 72.

The network interface 60 includes an electrical interface to the network 74 to which the monitoring camera is to be connected. Further, the network interface 60 also includes all logic interface parts that are not implemented as being executed by the processing unit 54. The network 74 may be any known type of LAN (Local Area Network), WAN (Wide Area Network), or the Internet. The person skilled in the art is well aware of how to implement a network interface using any of a plurality of known implementations and protocols.

The panning motor 62 and the tilting motor 66 are controlled by the processing 54 unit via each motor controller 64, 68. The motor controllers are arranged to convert instructions from the camera position controller 61 into electrical signals compatible with the motors. The camera position controller 61 may be implemented by means of code stored in memory 58 or by logical circuitry. The tilt motor 66 may be arranged within or very close to a panable/tiltable camera head 12 and the pan motor 62 are in many cases arranged further away from the camera head 12, particularly in the cases where the joint for panning is the second joint counted from the camera head 12. Control messages for pan and tilt may be received via the network 74 and processed by the processing unit 54 before forwarded to the motor controllers 64, 68.

Other implementations of the monitoring camera 10 are evident to the person skilled in the art.

Figure 7:
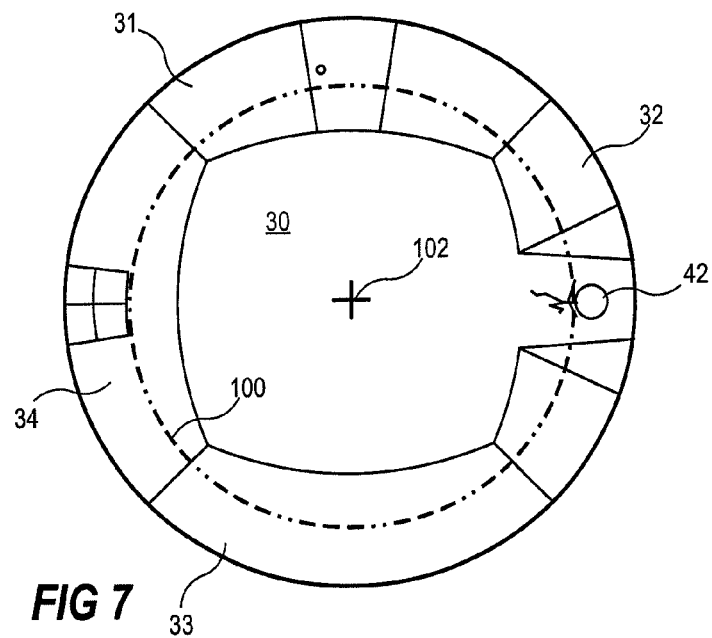
FIG. 7 is the overview image of FIG. 4 showing the virtual trip wire as defined according to one embodiment.

In order to, for example, facilitate monitoring large areas, monitoring a plurality of monitoring views, etc., a virtual tripwire functionality is implemented in the monitoring camera 10. The virtual tripwire, according to one embodiment, is defined by means of an alert line being a line enclosing a position in the camera view. For example, referring to FIG. 7, the virtual tripwire 100 may be defined as a circle having a center point 102, which it is obviously enclosing. The shape defining the tripwire may vary, e.g., it may be triangular, square, elliptic, star shaped, etc. However, one advantage of using basic shapes such as circles, squares, etc. is that the tripwire may be easily defined using simple mathematics.

Figure 4:
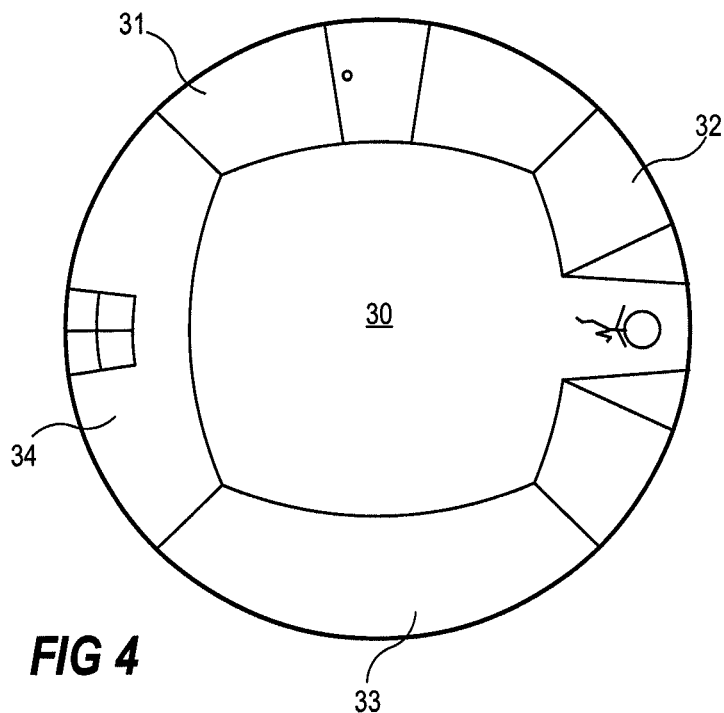
FIG. 4 is an example overview image from the monitoring camera in the example room of FIG. 3 capturing images through a wide angle lens as in FIG. 1.
Figure 5:
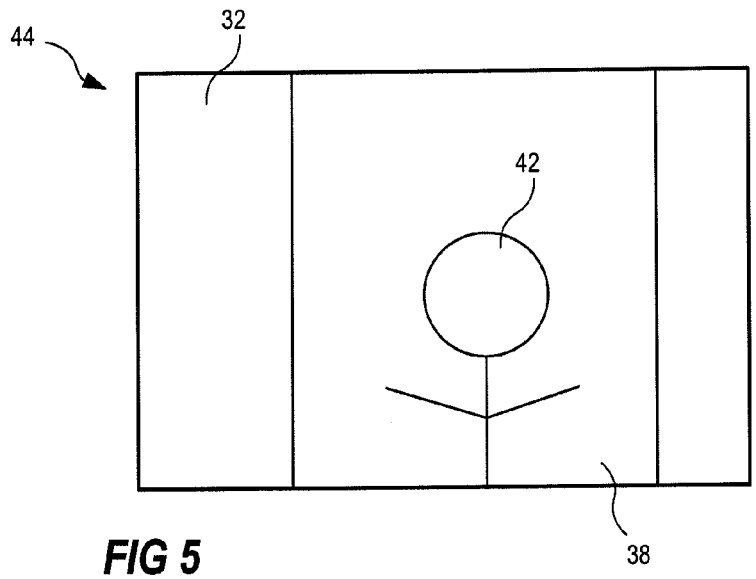
FIG. 5 is an example of a detailed view from the monitoring camera in example room of FIG. 3 capturing images through the dome glass as depicted in FIG. 2.

Further, the monitoring camera may be arranged to implement the above type of virtual tripwire 100 in overview mode and to leave the overview mode in response to the virtual tripwire 100 being broken/tripped in order to redirect the camera head 12 towards the position of the breaking of the virtual tripwire 100 for a closer view. In the example of FIG. 4, the person 42 breaking the virtual tripwire 100 results in the camera head 12 being tilted and panned to the position where an image of the person 42 will be captured by image sensor 50 of the camera head 12, now not capturing images through the wide angle lens 20, and perhaps resulting in an camera view like the one presented in FIG. 5.

The breaking of a virtual tripwire 100 may be detected when an object detected in the images captured by the camera 10 is found to occupy a position within the image view that is defined as a tripwire position. Alternatively, movement of the object is accounted for and a breaking of the tripwire 100 is only detected when a movement is detected in a position also being defined as a tripwire position.

Figure 8:
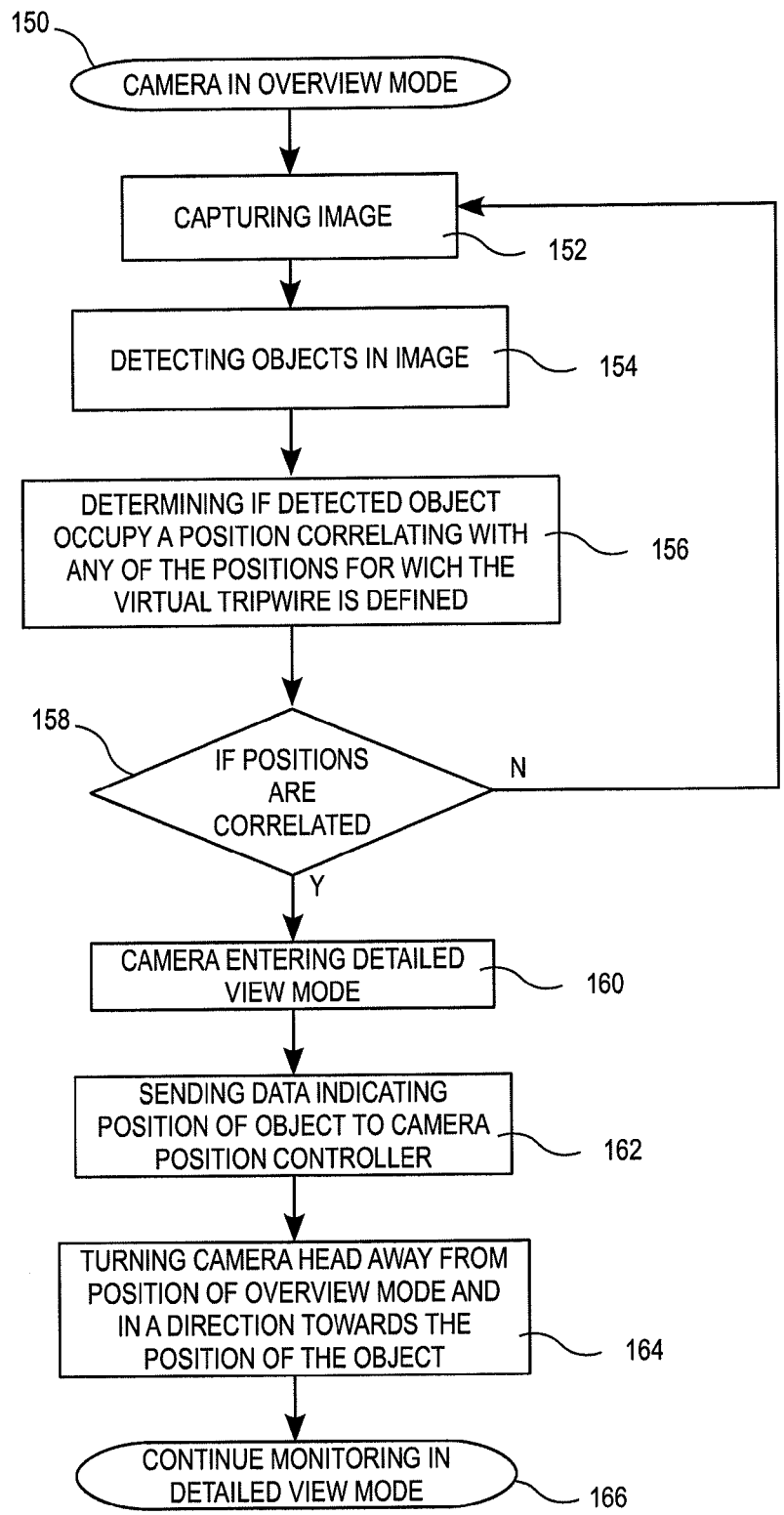
FIG. 8 is a flowchart of a process in a camera according to one embodiment.

In FIG. 8, one embodiment of a process of the camera being in overview mode 150 and configured with e.g. a virtual tripwire 100 as described above in connection with FIG. 7 is shown. The camera 10 may continuously capture images through the wide angle lens 20, step 152, as part of its monitoring functionality. For substantially each image, the camera 10 may apply an object detection algorithm in order to detect any objects present in the image view, step 154.

There are many different and known object detection algorithms that may be used for this process. These algorithms may include motion based detection, background comparison detection, or a combination of these types. Object detection may result in an object segmentation in which the image area including the object is determined. The object used in the testing of a tripwire event may be represented by the result from this segmentation.

A detected object 42, if any, will then be checked in regard of its position in relation to the positions for which the virtual tripwire 100 is defined, step 156. In other words, the position of the detected object 42 is correlated to the positions for which the virtual tripwire 100 is defined. If the position of the object 42 does not correspond to a position of the virtual tripwire 100 (i.e., the position of the object 42 is correlated to a position of the virtual tripwire 100), then the process continues to monitor in overview mode by returning to step 152. On the other hand, if the position of the object 42 corresponds to a position of the virtual tripwire 100, then the process continues to investigate the crossing of the tripwire 100 and the camera 10 enter detailed view mode, step 160, in which the camera head 12 is to be directed through the dome glass 14 and not through the wide angle lens 20. The position where the tripwire definition and the object correlates is sent to a camera position controller 61, step 162, and then signals for turning the camera according to this position are sent to the motor controllers 64, 68, and thereby the camera head 12 is turned in the direction of the object 42, step 166. Then the process continues in detailed view mode, step 166, until manually instructed to return to overview mode or until a timer expires and the camera therefore is returned to overview mode.

When setting up a camera 10 including an implementation, the camera 10 may be pre-set to have a tripwire shape 100 of a circle having a predetermined radius R and having its centre in the centre 102 of the image view of the overview image. Such pre-set may be stored in the non-volatile memory 58. Another parameter that may be used in defining the tripwire 100 is the distance L between the tripwire and the edge of the overview image. The user or the person performing the installation may then be presented a graphical interface showing the image view captured by the camera in overview mode and having the tripwire shape 100. In this case, a circle having the predetermined radius and being centered to the center of the image view is overlaid on the image presented. The functions of the graphical interface may be implemented by program code running on the processing unit 54. The user or person performing the installation may then be presented with the possibility to change the size of the tripwire shape 100 by simply pulling at the graphical representation of the tripwire using any known means, e.g. a mouse, touch screen, etc. The position of the tripwire shape 100 may also be moved by indicating the tripwire 100 and then moving it using any known type of interaction means. The shape of the tripwire 100 may then be changed to another predefined shape, e.g. a square, triangle, star, ellipse, rhomb, etc., or the person setting up the camera may define the tripwire by defining a polygonal shape. When the shape, size and position of the tripwire 100 have been determined, the tripwire function relating to the defined tripwire may be activated.

Figure 9:
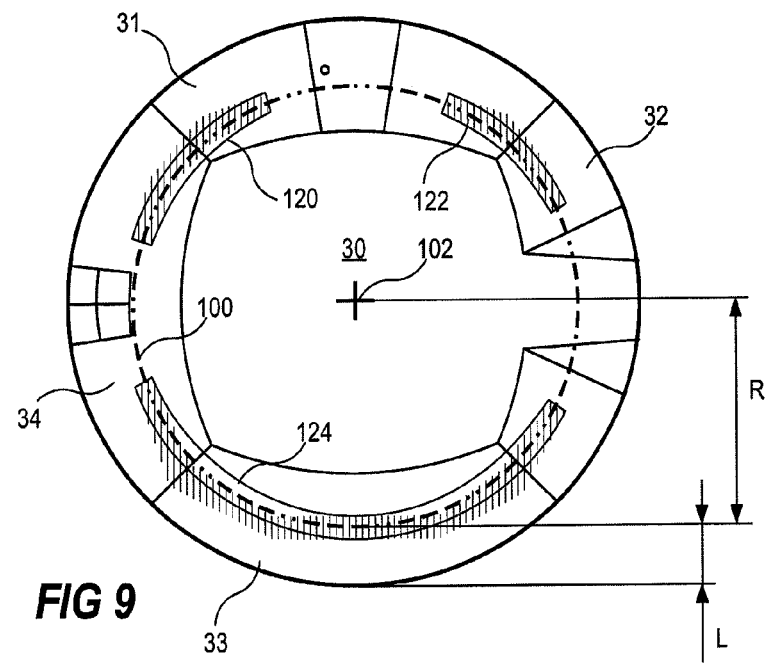
FIG. 9 is the overview image of FIG. 7 showing a trip wire having excluded portions.
Figure 10:
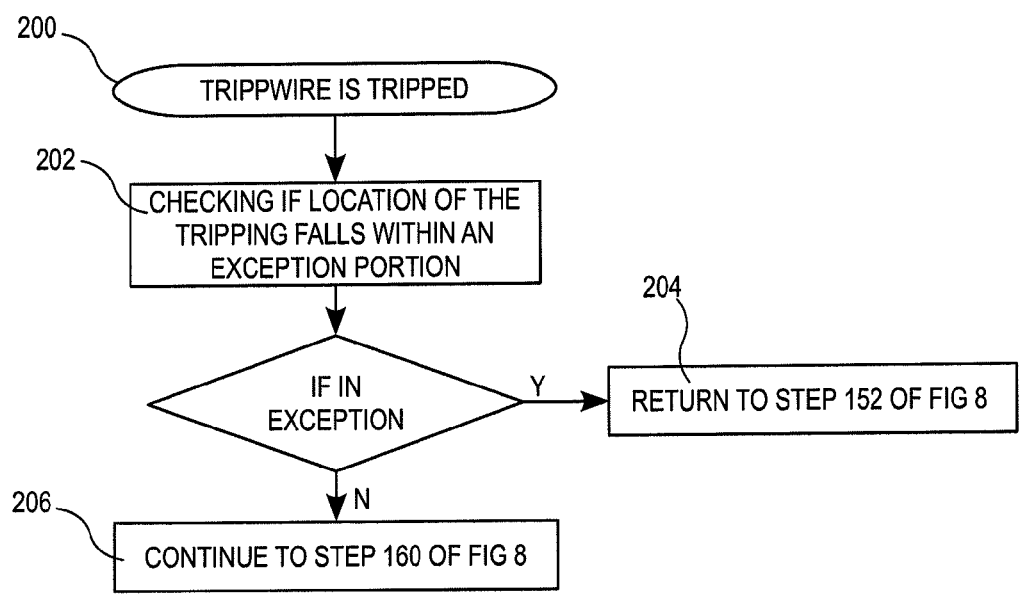
FIG. 10 is a flowchart of one embodiment which includes a process of handling a tripwire having excluded portions.

Now referring to FIG. 9, instead of defining a plurality of discrete and short tripwires it is suggested, in accordance with one embodiment, that a tripwire shape 100 is defined as described above and that portions of the tripwire 100 are marked as deactivated portions, 120, 122, 124. These portions may be implemented as exceptions. One example of the process of handling exceptions is described in FIG. 10. This process is inserted between step 158 and 160 in the process described in FIG. 8, i.e. this process is performed when it is determined that a position of the detected object 42 and a position of the definition of the tripwire correlates. Accordingly, when the tripwire 100 is tripped, step 200, then the location along the tripwire 100 of the tripping is checked, step 202, in order to determine if the location of the tripping falls within a portion of the tripwire 100 that is defined as an exception. If the location of the tripping falls within a portion defined as an exception, then the process returns to monitoring in overview mode, e.g. the process is returned to step 152 in the process of FIG. 8, see step 204. If the location of the object tripping falls within an active portion of the tripwire, i.e. not within an exception, process is continued as if the tripwire 100 where tripped in FIG. 8 (e.g., the process continues with step 160 in FIG. 8, see step 206). Otherwise the camera 100 may operate as previously described.

According to one embodiment, the camera 100 includes an event detector 76 which is arranged to detect tripping of a tripwire, i.e. crossing of a tripwire. The event detector 76 may be implemented by means of a program code stored in the non-volatile memory and executed by the processing unit 54. Further, the camera may include a camera position detector arranged to convert a position in the camera view to data.

According to one embodiment, a zoom factor of the camera when leaving the overview mode and entering the detailed view mode in order to get more detailed imagery of an object crossing a tripwire may be a fixed setting, may be determined by the distance from the center of the image view to the tripwire that was crossed or may be based on the size of the detected object.

In case of the zoom factor being based on the position of the tripwire, the camera may be configured to zoom more the further away from the centre of the image view the tripwire is positioned. The scaling of such zoom factor may be adjusted by information relating to the height at which the camera is mounted, i.e. how high above the ground/floor the camera is mounted.

If the size of the object is to be considered when determining the zoom factor, then the size of the segment or object is calculated at the time of detection and is sent to a process determining the zoom factor.

The invention claimed is:

1. A monitoring camera arranged to monitor a wide angle image view, the camera comprising:
a camera head including an image sensor and lenses; a pan motor arranged to pan the camera head in relation to a camera base; a tilt motor arranged to tilt the camera head in relation to the camera base; and
an event detector arranged to signal that an event has occurred when an alert line positioned in the wide angle image view is crossed by an object, wherein the alert line is defined as a line enclosing a point of the wide angle image view; and
a wide angle lens fixedly arranged in relation to the camera base and the wide angle lens having its optical axis aligned with the rotational axis of the camera head when panning, wherein the camera head is capable of being directed for capturing images through the wide angle lens.

2. The monitoring camera according to claim 1, further comprising a transparent dome shaped cover which the camera head is enabled to capture images through and onto which the wide angle lens is attached.

3. The monitoring camera according to claim 1, further comprising a camera position controller configured to generate control signals for the pan motor and the tilt motor, respectively, in order to control the direction of the camera head, wherein the camera position controller is connected to the event detector and is configured to, in response to a signal from the event detector, redirect the camera head from a view through the wide angle lens to a view including an area in which the alert line has been crossed.

4. The monitoring camera according to claim 1, wherein the alert line forms a shape and wherein the monitoring camera further comprises means for changing the size of the shape in response to a size change request received at the camera.

5. The monitoring camera according to claim 1, wherein the alert line is enclosing a center point of the wide angle image view.

6. The monitoring camera according to claim 1, wherein the event detector detects alert line crossings by analyzing images captured by the camera and evaluating the images in view of data defining the alert line.

7. The monitoring camera according to claim 1, wherein the alert line is arranged substantially at a distance L from the perimeter of the wide angle image view, wherein L is at most a quarter of the longest distance across the wide angle image view.

8. A method for monitoring an area using a monitoring camera comprising a camera head including an image sensor and lenses, a pan motor arranged to pan the camera head in relation to a camera base, and a tilt motor arranged to tilt the camera head in relation to the camera base, the method comprising:
- directing the camera head for capturing images representing a wide angle view through a wide angle lens fixedly arranged in relation to the camera base and with an optical axis of the wide angle lens aligned with the rotational axis of the camera head when panning;
- detecting if an object in the images is crossing an alert line defined in the wide angle view as a line enclosing a point in the wide angle view; and
- redirecting, in response to a detection of an object crossing the alert line, the camera head from capturing images through the wide angle lens to a position capturing an image view including an area in which the alert line was crossed.

9. The method according to claim 8, further comprising zooming, in connection with the redirection of the camera head, the lens of the camera head to a predetermined zoom value for capturing images of an area including the area where the alert line was crossed.

10. The method according to claim 8, wherein the alert line forms a circle.

11. The method according to claim 8, wherein the alert line forms a polygon.

* * * * *